July 4, 1967  S. J. WHITTAKER  3,329,036
ANTI-FRICTION POWER SCREW DRIVE
Filed Aug. 11, 1965
2 Sheets-Sheet 1
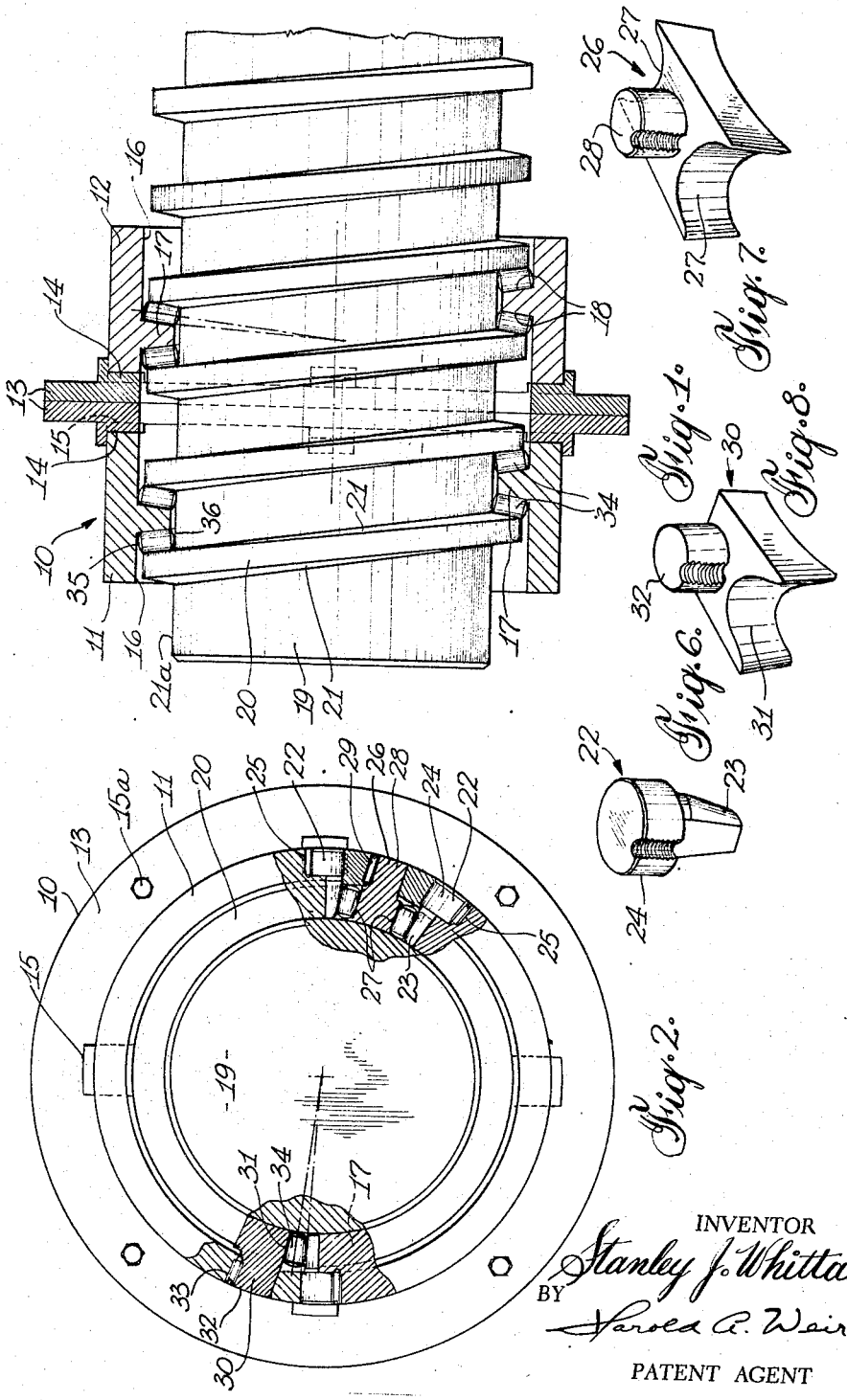
INVENTOR
Stanley J. Whittaker
BY
Harold A. Weir
PATENT AGENT July 4, 1967  S. J. WHITTAKER  3,329,036
ANTI-FRICTION POWER SCREW DRIVE
Filed Aug. 11, 1965                                    2 Sheets-Sheet 2

INVENTOR
Stanley J. Whittaker
BY
Harold G. Weir
PATENT AGENT

United States Patent Office 3,329,036
Patented July 4, 1967

3,329,036
ANTI-FRICTION POWER SCREW DRIVE
Stanley J. Whittaker, Deep River, Ontario, Canada, assignor to Atomic Energy of Canada Limited, Ottawa, Ontario, Canada, a corporation of Canada
Filed Aug. 11, 1965, Ser. No. 478,937
6 Claims. (Cl. 74—424.8)

ABSTRACT OF THE DISCLOSURE

A power screw assembly includes a screw and a nut in threaded association. A helical race passage is provided between each side surface of the nut thread and the confronting side surface of the screw thread. A plurality of rollers are freely disposed in each race passage, each roller having a tapered cylindrical surface in engagement with the side surfaces of the nut and screw threads.

---

Screw thread drives involving the use of ball or roller bearings have heretofore been proposed but difficulties are frequently encountered in the use of such drives. For instance, brinnelling of the ball races occurs when unit loads exceeding the elastic limit are encountered.

It is an object of this invention to provide a power screw drive involving the use of tapered roller bearings wherein the taper rollers follow an accurate geometric path to avoid skidding and to produce a true rolling action between nut and lead screw and thereby to achieve substantially improved efficiency.

The power screw assembly of the present invention comprises broadly a screw having a cylindrical surface and a helical thread on such surface, and a nut on the screw having an internal cylindrical surface and a helical thread on the nut surface. At least one endless race passage is formed between the cylindrical surfaces and is constituted in part by said threads. Each passage contains a plurality of rollers, each of which has a tapered cylindrical surface in engagement with the threads. An important feature resides in the fact that the intersection of a projection of the axis of each roller and a line coinciding with the tapered surface thereof falls on the axis of the screw. Another important feature resides in the formation of the nut in two half sections pre-loaded against each other.

Figure 5:
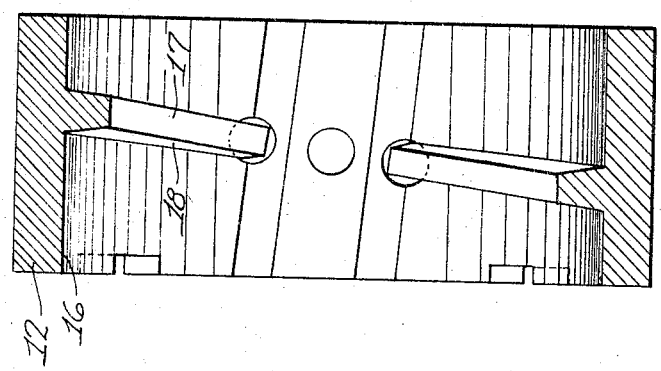
Figure 3:
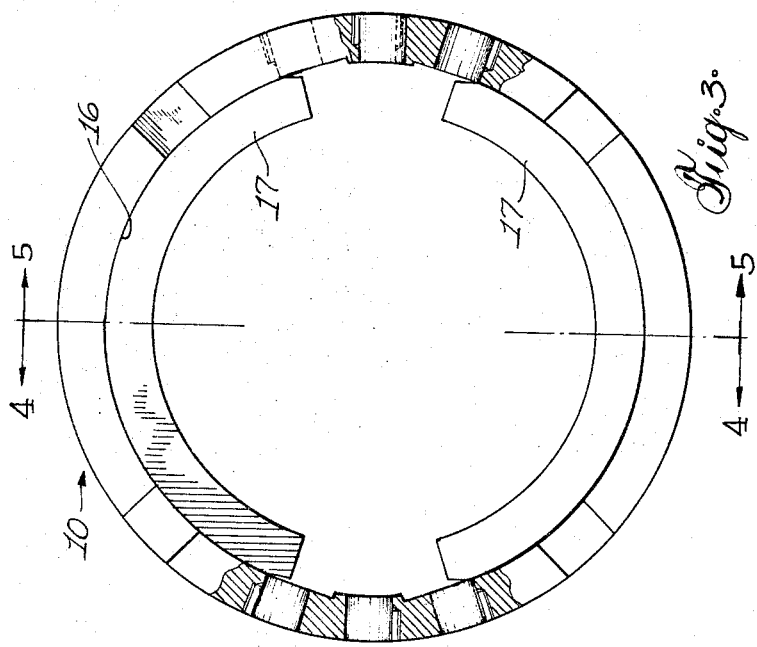
Figure 4:
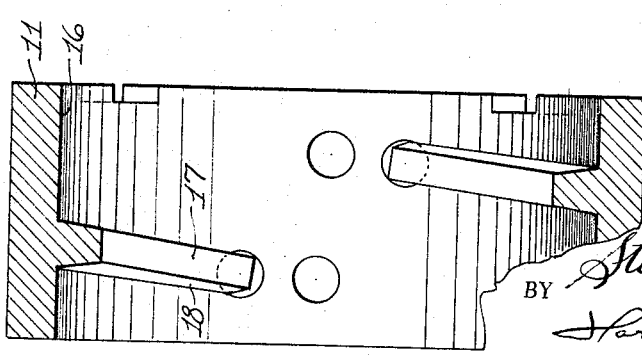

The invention will be described with reference to the accompanying drawings, in which FIGURE 1 is a sectional side elevation of a screw drive in accordance with the invention, FIGURE 2 is an end elevation, partly in section, of the screw drive, FIGURE 3 is an end elevation, partly in section, of one of the nut components, FIGURE 4 is a section on line 4—4 of FIGURE 3, FIGURE 5 is a section on line 5—5 of FIGURE 3, FIGURE 6 is a perspective view of one turnabout race insert member, FIGURE 7 is a perspective view of another turnabout race insert member, and FIGURE 8 is a perspective view of another turnabout race insert member.

Referring to the drawings, 10 is a nut assembly comprising a pair of substantially identical half sections 11 and 12 fixed to and preloaded against each other by means of a pair of annular plates or discs 13 each having driving tenons 14 fitting into slots 15 in the confronting end faces of the nut sections. Screws 15a fix the discs to each other and retain the desired pre-load in the nut sections.

Each nut section has on its inner cylindrical surface 16 an internal helical thread 17 which, as shown, extends through about 145°. Each thread 17 has tapered side wall surfaces 18 the planes of which at any section thereof intersect on the axis of the nut.

A screw member 19 is provided with a helical thread 20 on a cylindrical surface 21a. The depth of thread 20 is substantially the same as the depth of thread 17. The major diameter of screw 19 is slightly less than the diameter of nut surface 16. Each thread has tapered side wall surfaces 21 and it will be apparent that a nut thread surface 18 is in confronting relation with a screw thread surface 21. The theoretical apex of the imaginary cone produced by a continuation of confronting surfaces 18 and 21 will lie on the coaxis of the screw and nut.

Each nut thread 17 forms in cooperation with a portion of screw thread 20 a continuous roller bearing race which is further constituted by a turnabout race insert member 22 at each end of each thread 17 and which has a semi-cylindrical tapered surface 23 joining the ends of each pair of surfaces 18 and a dowel 24 fixing such member in position in the nut section as by a set screw 25.

The continuous race is further constituted by a second turnabout insert member 26 which is positioned between the helically aligned ends of nut thread 17 and which has a pair of curved, concave, tapered surfaces 27 one of which is disposed opposite the surface 23 of one member 22 and the other of which is disposed opposite the surface 23 of another member 22. The member 26 is fixed in position by means of a dowel 28 and set screw 29.

A third race insert member 30 is provided at each of the extreme ends of the thread 17. Member 30 is closely similar to member 26 but requires only one curved, concave, tapered surface 31 located opposite the surface 23 of a member 22. Member 30 is fixed in position by means of a dowel 32 and set screw 33.

Each of the two continuous races as described is filled with a plurality of bearing rollers 34. Each roller 34 is a circular, oblique cylinder with the angle of its tapered surface substantially coinciding with that of surfaces 18 and 21 with which it is arranged to have rolling engagement. Each roller 34 has, as shown, a convex base surface 35 for engagement with nut surface 16 and a convex base surface 36 for engagement with screw surface 21a.

The lead screw and nut are in slightly loose-fitting condition to provide an easy passage for the rollers on the return side of the threads. The resulting tendency of the nut to fall away from the true centre line of the lead screw, particularly in the horizontal position, is remedied by the pre-loading of the two half nut sections against each other. The complete nut assembly is thus accurately located on the pitch line of the lead screw, and it follows that when loaded, only one half of the nut assembly will be taking load, due to the initial pre-loading of the two halves.

The use of tapered rollers in a power screw drive such as described substantially eliminates unnecessary differential sliding or rubbing action whereby the unit may be operated without lubrication at high temperatures. The tapered rollers are designed specifically for each pitch diameter of thread, with the axis of the roller and the sides of the taper all meeting at the axis of the screw. Spreading thrust is substantially reduced and maximum use of allowable material bearing loads utilized. In other words, the uniform stress distribution of the rollers on the threads permits heavier load transmission per pitch without breakdown of the races due to brinnelling and/or spalling.

I claim:
1. A power screw assembly comprising a screw having a cylindrical surface and a helical thread on said surface, a nut on said screw having an internal cylindrical surface and a helical thread on said nut surface, each said thread having a pair of tapered side surfaces, each said side sur- face of said nut thread being in confronting spaced relation to a side surface of said screw thread to form an endless race passage therebetween, and a plurality of rollers freely disposed in each said race passage, each said roller having a tapered cylindrical surface in engagement with side surfaces of said nut and screw threads.

2. A power screw assembly as defined in claim 1, each said roller being a circular oblique cylinder, the intersection of a projection of the axis of said cylinder and a line coinciding with the tapered surface thereof falling on the axis of said screw.

3. A power screw assembly comprising a screw having a cylindrical surface and a helical thread on said surface, a nut assembly on said screw comprising a pair of nut sections each having an internal cylindrical surface and a helical thread on said nut surface, said nut sections being pre-loaded against each other and having means fixing said sections together in pre-loaded condition, means forming an endless race passage between each said nut surface and said screw surface, and a plurality of rollers in each said race passage, each said roller having a tapered cylindrical surface in engagement with one of said nut section threads and said screw thread.

4. A power screw assembly as defined in claim 3, the intersection of a projection of the axis of each said roller and a line coinciding with the tapered surface thereof falling on the axis of said screw, each said thread having tapered side surfaces engageable with said tapered roller surfaces.

5. A power screw assembly as defined in claim 4, each said nut section thread having an extent of less than 180°, and said passage forming means comprising a first member mounted on said nut section adjoining each end of said nut thread and having a curved tapered surface joining said tapered side surfaces of said nut thread, and a second member mounted on said nut section adjacent each end of said nut thread and having a curved tapered surface in opposed relation to said first member surface.

6. A power screw assembly as defined in claim 5, each said nut thread having an extent of about 145°.

References Cited

UNITED STATES PATENTS

| | | | |
|---|---|---|---|
| 1,047,674 | 12/1912 | McGinley | 74—459 |
| 1,831,080 | 11/1931 | Schmidt | 74—459 |
| 1,885,970 | 11/1932 | Westling | 74—458 |
| 2,833,156 | 5/1958 | Spontelli | 74—459 |
| 2,833,157 | 5/1958 | Gates | 74—459 |
| 2,938,400 | 5/1960 | Gondeck | 74—424.8 |
| 3,056,311 | 10/1962 | Musser | 74—424.8 |

FOREIGN PATENTS 952,966  3/1964  Great Britain.

DONLEY J. STOCKING, *Primary Examiner.*

L. H. GERIN, *Assistant Examiner.*